(12) United States Patent
Kang et al.

(10) Patent No.: US 12,649,263 B2
(45) Date of Patent: Jun. 9, 2026

(54) MANUFACTURING METHOD OF TRANSPARENT ULTRA-THIN FILM AND TRANSPARENT ULTRA-THIN FILM PRODUCED THEREBY

(71) Applicant: THE INDUSTRY & ACADEMIC COOPERPATION IN CHUNGNAM NATIONAL UNIVERSITY (IAC), Daejeon (KR)

(72) Inventors: Seong Min Kang, Busan (KR); Ji Seong Choi, Daejeon (KR)

(73) Assignee: THE INDUSTRY & ACADEMIC COOPERPATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 261 days.

(21) Appl. No.: 18/382,557

(22) Filed: Oct. 23, 2023

(65) Prior Publication Data

US 2024/0375323 A1     Nov. 14, 2024

(30) Foreign Application Priority Data

May 11, 2023    (KR) ........................ 10-2023-0061276

(51) Int. Cl.
*B29C 33/38* (2006.01)
*B29C 33/40* (2006.01)
*B29C 33/42* (2006.01)
*B29K 71/00* (2006.01)

(52) U.S. Cl.
CPC .......... *B29C 33/3857* (2013.01); *B29C 33/40* (2013.01); *B29C 33/42* (2013.01); *B29K 2071/00* (2013.01); *B29K 2875/00* (2013.01); *B29K 2995/007* (2013.01)

(58) Field of Classification Search
CPC ...... B29C 33/3857; B29C 33/40; B29C 33/42
See application file for complete search history.

(56) References Cited

U.S. PATENT DOCUMENTS

2019/0112186 A1* 4/2019 Jang ........................ B29C 33/00
2022/0221385 A1* 7/2022 Kim ........................ G01N 3/12

FOREIGN PATENT DOCUMENTS

KR          10-2521984 B1     4/2023

OTHER PUBLICATIONS

Sarkar, R., & Rajagopalan, J. (2018). Synthesis of thin films with highly tailored microstructures. Materials Research Letters, 6(7), 398-405. https://doi.org/10.1080/21663831.2018.1471420 accessed at https://www.tandfonline.com/doi/full/10.1080/21663831.2018. 1471420#abstract on Dec. 11, 2025 (Year: 2018).*

* cited by examiner

*Primary Examiner* — JaMel M Nelson
(74) *Attorney, Agent, or Firm* — Revolution IP, PLLC

(57) ABSTRACT

The present disclosure provides a method for manufacturing a transparent ultra-thin film including the steps of (a) supplying different PUA precursors to two silicon masters, respectively, and then curing the PUA precursors by irradiation with ultraviolet ray, (b) separating a PUA mold formed by curing the different PUA precursors from the two silicon masters, (c) supplying perfluoropolyether (PFPE) precursor between the PUA molds, and then curing the PEPE precursor by irradiation with the ultraviolet ray, and (d) separating the PUA mold to prepare an ultra-thin film in which the PFPE precursor is cured, and a transparent ultra-thin film manufactured thereby.

2 Claims, 12 Drawing Sheets

(a)               (b)

(a)                                                    (b)

1

MANUFACTURING METHOD OF TRANSPARENT ULTRA-THIN FILM AND TRANSPARENT ULTRA-THIN FILM PRODUCED THEREBY

CROSS REFERENCE TO RELATED APPLICATION

The present application claims priority to Korean Patent Application No. 10-2023-0061276, filed May 11, 2023, the entire contents of which is incorporated herein for all purposes by this reference.

BACKGROUND OF THE INVENTION

Field of the Invention

The present disclosure relates to a method for manufacturing a transparent ultra-thin film and a transparent ultra-thin film manufactured thereby, and more particularly, to a method for manufacturing an ultra-thin film that is more transparent in water by simulating a nanostructure having an anti-reflection effect on both sides of the wing surface of a transparent butterfly (Greta-oto), and an ultra-thin film manufactured thereby.

Description of the Related Art

Highly transparent films are required in various fields including ophthalmology and display industries, and have been developed to increase light efficiency in various industries.

In order to realize a transparent film, it is essential to optimize the structure and material to suppress reflection, and since this reflection occurs due to a sudden change in the refractive index at the surface when light is incident on the film from air, selecting a material with a refractive index closest to 1, the refractive index of air, is advantageous in reducing reflection.

In relation to the above, with the rapid progress of lightening, thinning and high performance of electronic devices, resin is used as a material to replace the glass of a glass substrate, which is a display panel substrate for conventional displays and touch panels. Among these resins, one of the promising materials is polyimide, which is used in the form of a film, in view of its excellent heat resistance and dimensional stability.

However, polyamic acid, which is a polyimide precursor for a material of a polyimide film, has a problem in that it is difficult to increase the degree of polymerization due to an increase in viscosity due to a strong hydrogen bond.

In addition, the conventional technology described above has relatively low thermal and mechanical properties when the polymerization degree is low, making it difficult to obtain sufficient physical properties even after imidization, and in particular, it is difficult to apply to a transparent polyimide film used as a display window.

Documents of Related Art (Patent Document 1) KR Patent Registered No. 10-2521984 (2023 Apr. 11)

SUMMARY OF THE INVENTION

An object of the present disclosure for solving the above problem is to provide a method for manufacturing a transparent ultra-thin film in which both sides of a plurality of elliptical structures integrally formed by combining side parts with each other are formed in a semi-elliptical shape so that the reflection of light irradiated to the plurality of elliptical structures is minimized, thereby making the film not only transparent in the atmospheric environment but also more transparent in the underwater environment, and a transparent ultra-thin film produced thereby.

The objects of the present disclosure are not limited to the above-mentioned objects, and other objects not mentioned will be clearly understood by those skilled in the art from the following description.

In order to achieve the above object, the configuration of the present disclosure provides a method for manufacturing a transparent ultra-thin film comprising the steps of (a) supplying different PUA precursors to two silicon masters, respectively, and then curing the PUA precursors by irradiation with ultraviolet ray; (b) separating a PUA mold formed by curing the different PUA precursors from the two silicon masters; (c) supplying perfluoropolyether (PEPE) precursor between the PUA molds, and then curing the PEPE precursor by irradiation with the ultraviolet ray; and (d) separating the PUA mold to prepare an ultra-thin film in which the PFPE precursor is cured.

In the embodiment of the present disclosure, in the step (a), the silicon master may include a flat silicon base having a predetermined thickness and a plurality of silicon convex members coupled to the upper surface of the silicon base to form a matrix. Also, the different PUA precursors may include a soft-PUA precursor and a hard-PUA precursor having a lower elastic modulus than that of the soft-PUA precursor. Also, the PUA mold may include a soft-PUA mold formed by curing the soft-PUA precursor and a hard-PUA mold formed by curing the hard-PUA precursor. Also, the step (a) may include the steps of a1) supplying the soft-PUA precursor and the hard-PUA precursor to upper portions of the two silicon masters, respectively; (a2) irradiating the ultraviolet ray toward the soft-PUA precursor and the hard-PUA precursor, respectively; and (a3) curing the soft-PUA precursor and the hard-PUA precursor to form the soft-PUA mold and the hard-PUA mold.

In the embodiment of the present disclosure, in the step (b), the different PUA precursors may include the soft-PUA precursor and the hard-PUA precursor that has a lower elastic modulus than that of the soft-PUA precursor. Also, the PUA mold may include the soft-PUA mold formed by curing the soft-PUA precursor and the hard-PUA mold formed by curing the hard-PUA precursor. The step (b) may include the steps of (b1) separating the soft-PUA mold from one of the two silicon masters; and (b2) separating the hard-PUA mold from the other of the two silicon masters.

In the embodiment of the present disclosure, in the step (c), the PUA mold may include the soft-PUA mold formed by curing the soft-PUA precursor and the hard-PUA mold formed by curing the hard-PUA precursor. Also, the step (c) may include the steps of (c1) supplying the PFPE precursor between the soft-PUA precursor and the hard-PUA precursor; (c2) irradiating the ultraviolet ray toward the PFPE precursor; and (c3) curing the PFPE precursor irradiated with the ultraviolet ray to form the ultra-thin film.

In the embodiment of the present disclosure, in the step (d), the PUA mold may include the soft-PUA mold formed by curing the soft-PUA precursor and the hard-PUA mold formed by curing the hard-PUA precursor. Also, the step (d) may include the steps of (d1) separating the soft-PUA mold from the ultra-thin film; (d2) supplying a solvent to an edge of the ultra-thin film; (d3) separating the hard-PUA mold from the ultra-thin film; and (d4) manufacturing the ultra-thin film in which the soft-PUA mold and the soft-PUA mold are separated.

Further, In order to achieve the above object, the configuration of the present disclosure provides a transparent ultra-thin film manufactured by the above described method for manufacturing the transparent ultra-thin film, comprising a plurality of elliptical structures which is integrally formed by combining side parts with each other, wherein the plurality of elliptical structures is formed in a shape of an elliptical sphere to minimize reflection of light irradiated to the plurality of elliptical structures, thereby becoming transparent.

In the embodiment of the present disclosure, the plurality of elliptical structure may be formed by simulating a structure of a wing of a transparent butterfly (Greta-oto).

In the embodiment of the present disclosure, the plurality of elliptical structure may include an elliptical base; an upper convex member that is located on an upper portion of the elliptical base and is convex upwardly formed; and a lower convex member that is located on a lower portion of the elliptical base while facing the upper convex member based on the elliptical base, and is convex downwardly formed.

In the embodiment of the present disclosure, the elliptical structure may have a refractive index of 1.337.

DETAILED DESCRIPTION OF THE INVENTION

Figure 1:
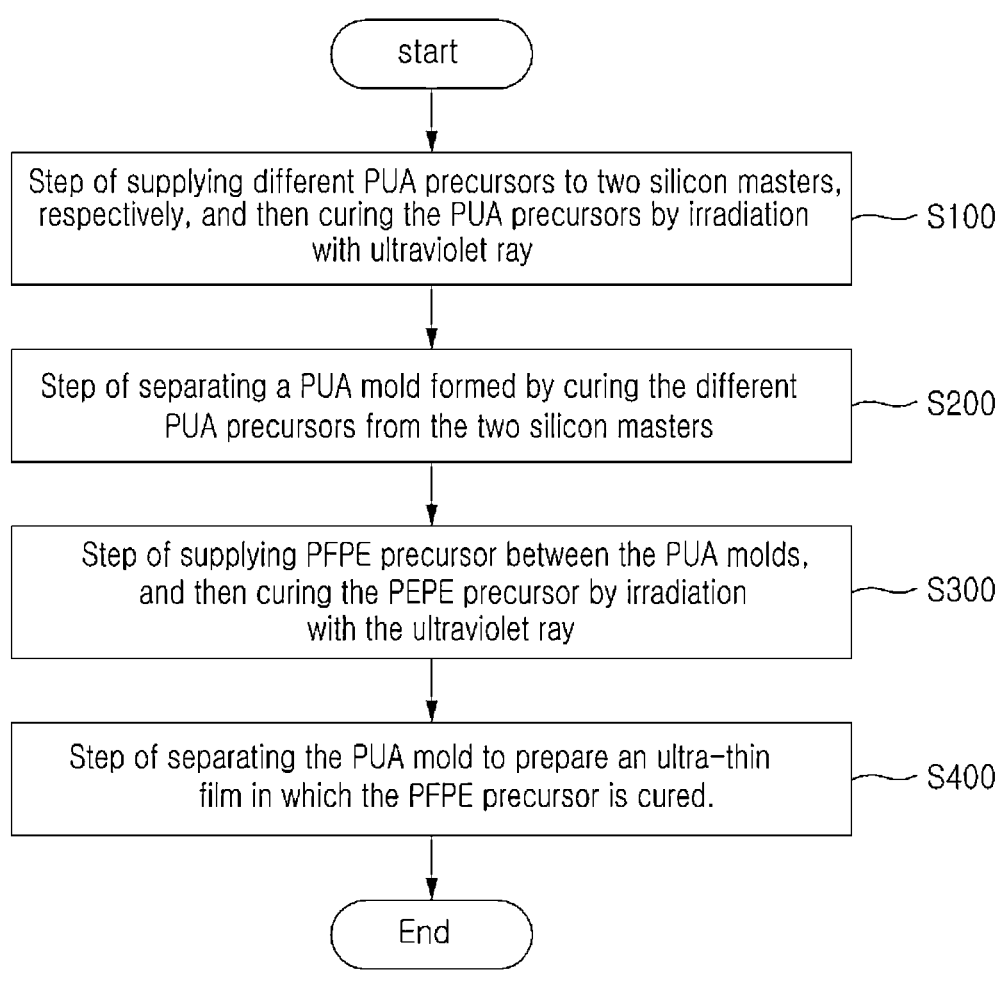
FIG. 1 is a flow chart showing a method for manufacturing a transparent ultra-thin film according to an embodiment of the present disclosure.

Hereinafter, the present disclosure will be explained with reference to the accompanying drawings. The invention, however, may be implemented in various different ways or forms, and should not be construed as limited to the embodiments set forth herein. Also, in order to clearly explain the present disclosure, portions that are not related to the invention are omitted, and like reference numerals are used to refer to like elements throughout.

Throughout the specification, it will be understood that when a portion is referred to as being "connected (accessed, contacted, coupled)" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

The terminology used herein is for the purpose of describing various embodiments only and is not intended to limit the present disclosure. It is to be understood that the singular forms include plural referents unless the context clearly dictates otherwise. It will be further understood that the terms "comprises" or "has," when used in this specification, specify the presence of a stated feature, number, step, operation, component, element, or combination thereof, but do not preclude the presence or addition of one or more other features, numbers, steps, operations, components, elements, or combinations thereof.

Hereinafter, embodiments of the present disclosure will be described in detail with reference to the accompanying drawings.

FIG. 1 is a flow chart showing a method for manufacturing a transparent ultra-thin film according to an embodiment of the present disclosure.

1. Manufacturing Method of Transparent Ultra-Thin Film

Hereinafter, a method for manufacturing a transparent ultra-thin film according to an embodiment of the present disclosure will be described with reference to FIGS. 1 and 2.

Referring to FIG. 1, a method for manufacturing a transparent ultra-thin film according to an embodiment of the present disclosure includes the steps of (a) supplying different PUA precursors to two silicon masters 100, respectively, and then curing the PUA precursors by irradiation with ultraviolet rays (S100), (b) separating a PUA mold 200 formed by curing the different PUA precursors from the two silicon masters 100 (S200), (c) supplying perfluoropolyether (PFPE) precursor between the PUA molds 200, and then curing the PEPE precursor by irradiation with ultraviolet rays (S300), and (d) separating the PUA mold 200 to prepare an ultra-thin film 300 in which the PFPE precursor is cured (S400).

Figure 2:
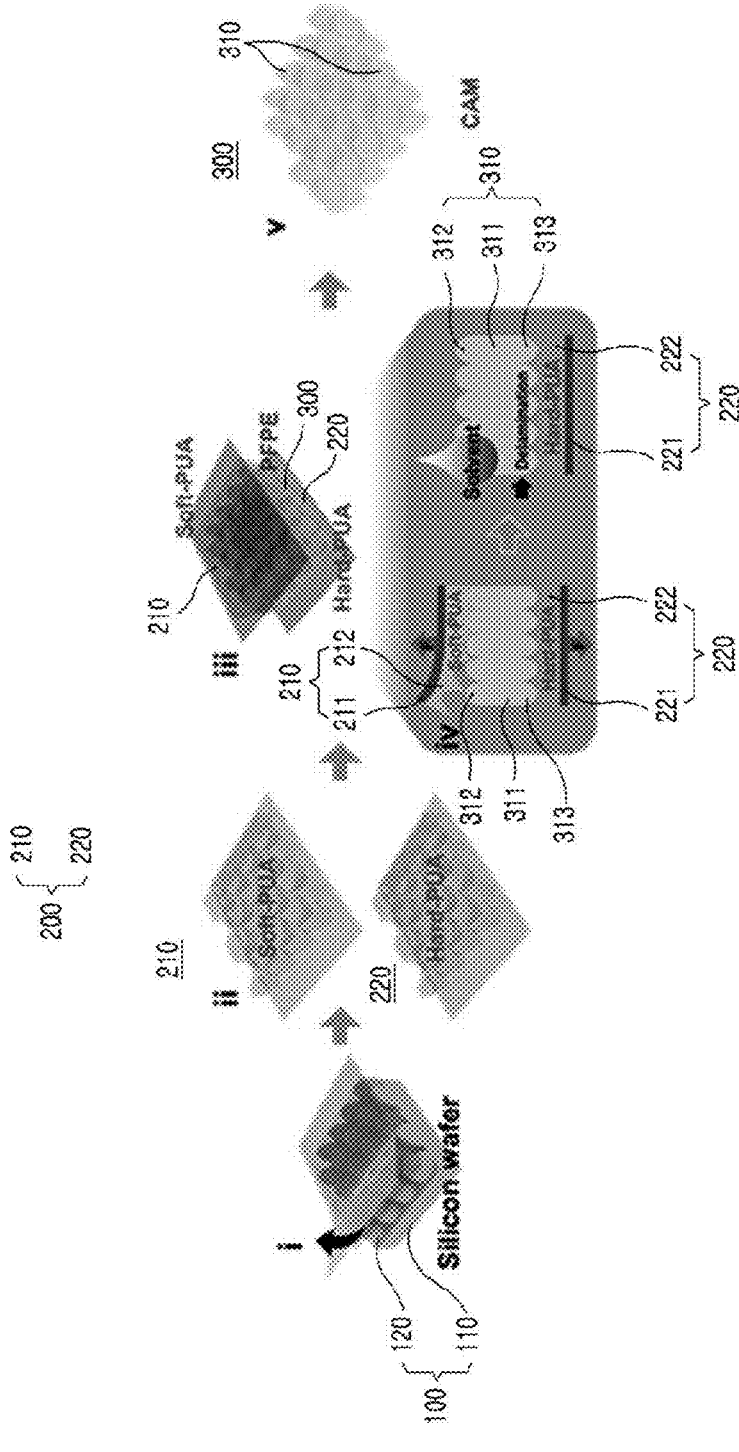
FIG. 2 is a conceptual diagram showing a process of manufacturing a transparent ultra-thin film according to a method for manufacturing a transparent ultra-thin film of an embodiment of the present disclosure.

FIG. 2 is a conceptual diagram showing a process of manufacturing a transparent ultra-thin film according to a method for manufacturing a transparent ultra-thin film of an embodiment of the present disclosure.

Referring to FIG. 2, in step (a), the silicon master 100 includes a flat silicon base 110 having a predetermined thickness and a plurality of silicon convex members 120 coupled to the upper surface of the silicon base 110 to form a matrix.

Specifically, the different PUA precursors include a soft-PUA precursor and a hard-PUA precursor having a lower elastic modulus than that of the soft-PUA precursor.

Also, referring to FIG. 2, the PUA mold 200 includes a soft-PUA mold 210 formed by curing the soft-PUA precursor and a hard-PUA mold 220 formed by curing the hard-PUA precursor.

Specifically, referring to FIG. 2, the PUA mold 200 includes the soft-PUA mold 210 and the hard-PUA mold 220.

Referring to FIG. 2, the soft-PUA mold 210 includes a soft-PUA mold base 211 and a soft-PUA mold concave member 212.

The soft-PUA mold base 211 is formed by irradiating and curing the soft-PUA precursor with ultraviolet rays, and may have a flat plate shape having a predetermined thickness.

As shown in FIG. 2, the soft-PUA mold concave member 212 extends downward from the lower surface of the soft-PUA mold base 211 and is formed to correspond with the plurality of upper convex members 312.

The hard-PUA mold 220 includes a hard-PUA mold base 221 and a hard-PUA mold concave member 222.

The hard-PUA mold base 221 is formed by irradiating and curing the hard-PUA precursor with ultraviolet rays, and may have a flat plate shape having a predetermined thickness.

As shown in FIG. 2, the hard-PUA mold concave member 222 extends upward from the upper surface of the hard-PUA mold base 221 and is formed to correspond with the plurality of lower convex members 313.

The step (a) includes the steps of (a1) supplying a soft-PUA precursor and a hard-PUA precursor to the upper portion of the two silicon masters 100, respectively, (a2) irradiating ultraviolet rays toward the soft-PUA precursor and the hard-PUA precursor, respectively, and (a3) curing the soft-PUA precursor and the hard-PUA precursor to form the soft-PUA mold 210 and the hard-PUA mold 220.

In step (b), the different PUA precursors include the soft-PUA precursor and the hard-PUA precursor that has a lower elastic modulus than that of the soft-PUA precursor, and the PUA mold 200 includes the soft-PUA mold 210 formed by curing the soft-PUA precursor and the hard-PUA mold 220 formed by curing the hard-PUA precursor.

Further, the step (b) includes the steps of (b1) separating the soft-PUA mold 210 from one of the two silicon masters 100 and (b2) separating the hard-PUA mold 220 from the other of the two silicon masters 100.

The soft-PUA mold 210 and hard-PUA mold 220 formed by the step (b2) are negative molds of nanostructures.

In step (c), the PUA mold 200 includes the soft-PUA mold 210 formed by curing the soft-PUA precursor and the hard-PUA mold 220 formed by curing the hard-PUA precursor.

Further, the step (c) includes the steps of (c1) supplying the PFPE precursor between the soft-PUA precursor and the hard-PUA precursor, (c2) irradiating ultraviolet rays toward the PFPE precursor, and (c3) curing the PFPE precursor irradiated with ultraviolet rays to form the ultra-thin film 300.

In step (d), the PUA mold includes the soft-PUA mold 210 formed by curing the soft-PUA precursor and the hard-PUA mold 220 formed by curing the hard-PUA precursor.

Next, the step (d) includes the steps (d1) separating the soft-PUA mold 210 from the ultra-thin film 300, (d2) supplying a solvent to the edge of the ultra-thin film 300, (d3) separating the hard-PUA mold 220 from the ultra-thin film 300, and (d4) manufacturing the ultra-thin film 300 in which the soft-PUA mold 210 and the soft-PUA mold 220 are separated.

Specifically, since the soft-PUA mold 210 and the hard-PUA mold 220 have different moduli of elasticity, the soft-PUA mold 210 having a greater modulus of elasticity than that of the hard-PUA mold 220 is first separated from the ultra-thin film 300 as in step (d1).

Next, the hard-PUA mold 220 is more difficult to be separated from the ultra-thin film 300, compared to the soft-PUA mold 210.

Accordingly, when solvent is supplied to the edge of the ultra-thin film 300 as in step (d2) above, the edge of the hard-PUA mold 220 is separated from the ultra-thin film 300.

Next, in the step (d3), the hard-PUA mold 220 is separated from the ultra-thin film 300 as a whole, starting from the edge thereof.

Steps (d2) and (d3) are the processes for improving the yield and integrity of the ultra-thin film 300, and are different from conventional soft molding techniques.

Accordingly, as in step (d4) above, the ultra-thin film 300 in which the soft-PUA mold 210 and the soft-PUA mold 220 are separated is manufactured.

2. Transparent Ultra-Thin Film (300)

Hereinafter, a transparent ultra-thin film according to an embodiment of the present disclosure will be described with reference to FIGS. 1 to 17.

Referring to FIG. 2, the transparent ultra-thin film 300 according to an embodiment of the present disclosure is a transparent ultra-thin film manufactured by the method for manufacturing a transparent ultra-thin film according to the above, including a plurality of elliptical structures 300 which is integrally formed by combining side parts with each other.

Figure 3:
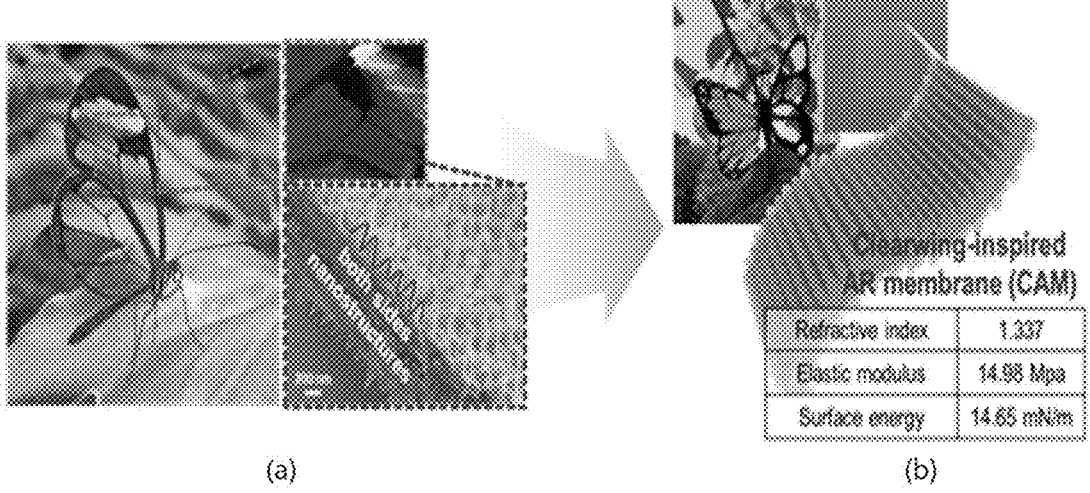
FIG. 3 shows a diagram (a) illustrating a transparent butterfly and a detailed structure of a wing of a transparent butterfly, and a diagram (b) illustrating an artificial butterfly model to which a transparent ultra-thin film according to an embodiment of the present disclosure is applied and the characteristics of the transparent ultra-thin film.

In FIG. 3, (a) is a diagram showing a transparent butterfly and a detailed d structure of a wing of the transparent butterfly. In FIG. 3, (b) is a diagram illustrating an artificial butterfly model to which a transparent ultra-thin film according to an embodiment of the present disclosure is applied and the characteristics of the transparent ultra-thin film.

Specifically, the plurality of elliptical structures 310 is formed by mimicking the structure of the wings of a transparent butterfly (Greta-oto), as shown in (a) in FIG. 3.

On the left side in (a) in FIG. 3, a transparent butterfly (Greta-oto) is shown, and on the upper right side in (a) in FIG. 3, some of the wings of the transparent butterfly (Greta-oto) are shown. In the lower right in (a) in FIG. 3, as a scanning electron microscope (SEM) image of a part of the wing of the transparent butterfly (Greta-oto), the both-side nanostructure is shown.

In the present disclosure, the structure of the wing of the transparent butterfly (Greta-oto) having the both-side nano-structure is simulated.

In FIG. 3, (b) shows the characteristics of clearwing-inspired anti-reflective (AR) Membrane (CAM) ultra-thin film, which is made of perfluoropolyether (PEPE) and an artificial butterfly model.

Specifically, the elliptical structure 310 has a refractive index of 1.337 as shown in (b) in FIG. 3.

In addition, the elliptical structure 310 has an elastic modulus of 14.98 Mpa and a surface energy of 14.65 mN/m.

Referring to FIG. 2, the elliptical structure 310 includes an elliptical base 311, an upper convex member 312 and a lower convex member 313.

Figure 4:
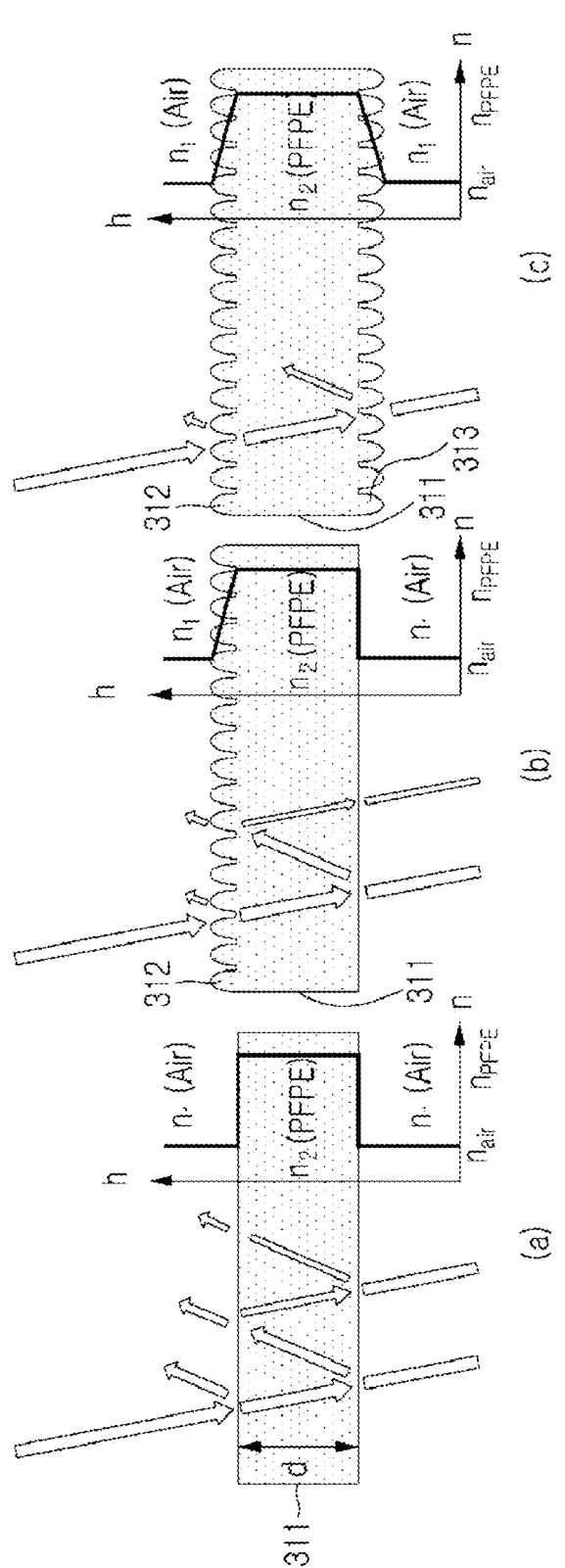
FIG. 4 shows conceptual diagrams (a), (b), and (c) comparing refractive index profiles of a flat structure, a moth-eye mimic structure, and a transparent ultra-thin film according to an embodiment of the present disclosure.

In FIG. 4, (a), (b), and (c) are conceptual diagrams comparing refractive index profiles of a flat structure, a moth-eye mimic structure, and a transparent ultra-thin film according to an embodiment of the present disclosure.

In FIG. 4, (a) shows the refractive index profile of a flat structure (bare PFPE) composed of the plurality of elliptical bases 311. In FIG. 4, (b) shows the refractive index profile of a moth eye-like structure in which a plurality of semi-elliptical spheres including the elliptical base 311 and the upper convex member 312 formed on the upper portion of the elliptical base 311 is formed. In FIG. 4, (c) shows the refractive index profile of the transparent ultra-thin film 300 (clearwing-inspired anti-reflective (AR) Membrane (CAM)) according to an embodiment of the present disclosure.

The plurality of elliptical structures 310 is formed in the shape of an elliptical sphere to minimize reflection of light irradiated to the plurality of elliptical structures, thereby becoming transparent in water.

Referring to (a), (b), and (c) in FIG. 4, it can be seen that the transparent ultra-thin film 300 according to an embodiment of the present disclosure reflects relatively little light compared to the flat structure and the moth eye-like structure.

Specifically, the semi-elliptical sphere shape can achieve a gradually decreasing refractive index as the area of the nanostructure gradually increases when light is incident, whereas the cylindrical shape cannot effectively reduce reflectivity because it cannot achieve a gradually decreasing refractive index.

However, the cone shape can have a gradually decreasing refractive index and can be used, but it is very difficult to manufacture a very small fine nanostructure on the top of the cone.

Therefore, a semi-elliptical spherical shape is the most preferable structure for achieving the gradually decreasing refractive index.

Referring to FIG. 2, the elliptical base 311 may have a cylindrical shape.

In addition, the upper convex member 312 is convex upwardly formed on the upper portion of the elliptical base 311, and the lower convex member 313 is convex down-wardly formed on the lower portion of the elliptical base 311.

The elliptical base 311 is formed by curing the PFPE precursor after being irradiated with ultraviolet rays, and is made of perfluoropolyether (PFPE).

The upper convex member 312 is located on the upper portion of the elliptical base 31 and is convex upwardly formed, and has a semi-elliptical sphere shape.

In addition, the upper convex member 312 is cured after the PFPE precursor is irradiated with ultraviolet rays, and is made of perfluoropolyether (PFPE).

The lower convex member 313 is located on the lower portion of the elliptical base 311 while facing the upper convex member 312 based on the elliptical base 311, is convex downwardly formed, and has a semi-elliptical sphere shape.

In addition, the lower convex member 313 is cured after the PFPE precursor is irradiated with ultraviolet rays, and is made of perfluoropolyether (PEPE).

Figure 5:
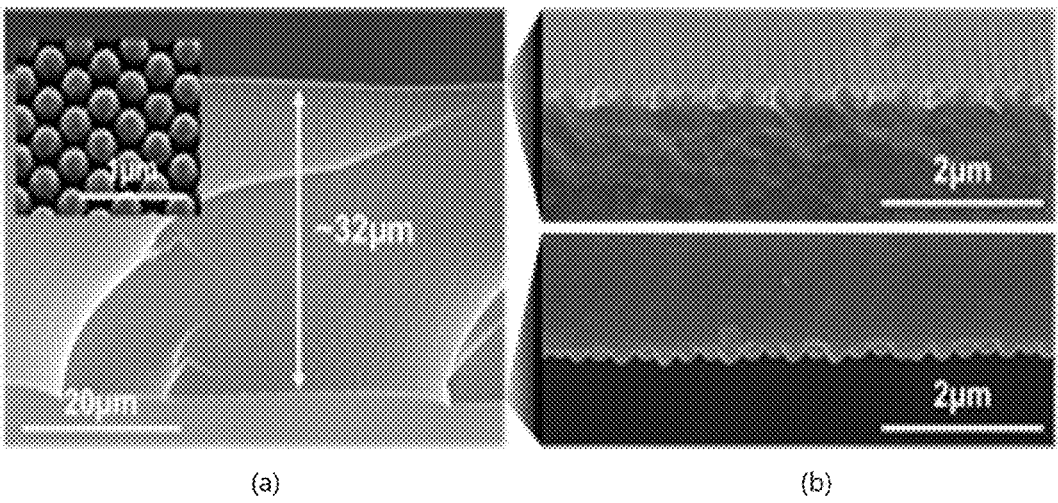
FIG. 5 shows SEM images (a) and (b) of a transparent ultra-thin film according to an embodiment of the present disclosure.

In FIG. 5, (a) and (b) are SEM images of a transparent ultra-thin film according to an embodiment of the present disclosure.

As an example, the plurality of elliptical structures 310 may have a thickness of 32 μm, as shown in (a) in FIG. 5, and the upper convex member 312 and the lower convex member 313 have a diameter of 300 μm, but are not limited thereto.

The above described elliptical base 311, upper convex member 312 and lower convex member 313 are integrally formed.

Figure 6:
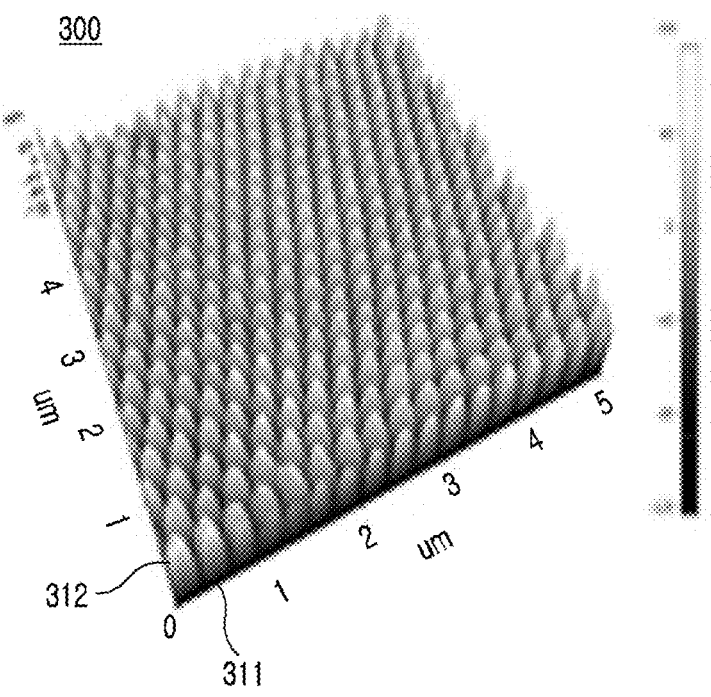
FIG. 6 is a perspective diagram in one direction of a shape of a transparent ultrathin film according to an embodiment of the present disclosure, which is measured by AFM.

FIG. 6 is a perspective diagram in one direction of a shape of a transparent ultrathin film according to an embodiment of the present disclosure, which is measured by AFM.

Although the present disclosure may be described as the described ultra-thin film 300 having upper and lower convex portions as shown in FIG. 2, the present disclosure may be implemented to the ultra-thin film 300 having only an upper convex portion as shown in FIG. 6.

Figure 7:
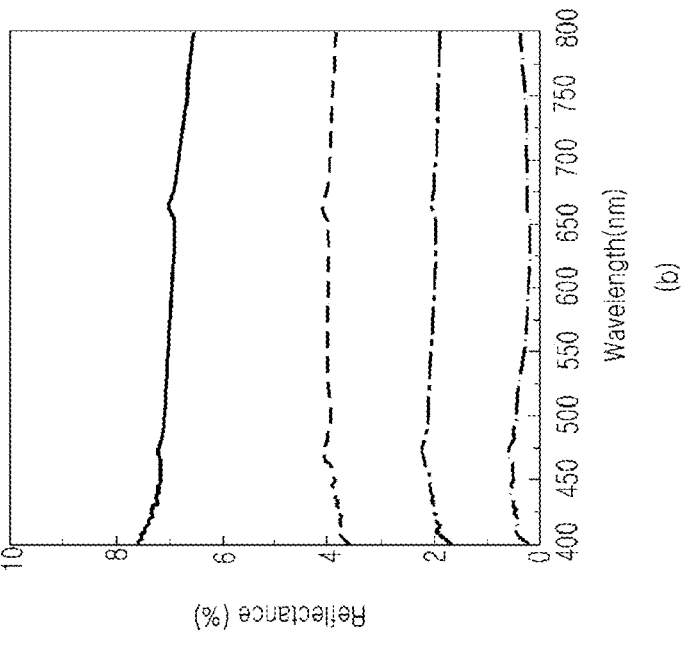
FIG. 7 shows graphs (a) and (b) illustrating transmittance and reflectance of a transparent ultrathin film according to an embodiment of the present disclosure compared to a glass, a flat structure, and one-side nanostructure.
Figure 7:
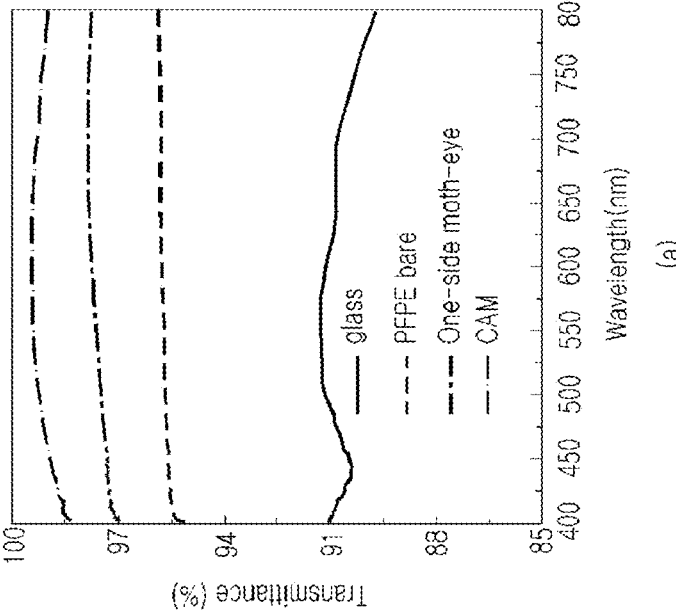

In FIG. 7, (a) and (b) are graphs showing transmittance and reflectance of a transparent ultrathin film according to an embodiment of the present disclosure compared to a glass, a flat structure, and one-side nanostructure. Referring to (a) in FIG. 7, it can be confirmed that the transmittance and reflectance of the transparent ultra-thin film 300 according to an embodiment of the present disclosure are greater than those of the surfaces of a glass, flat structure (bare PFPE), and one-side nanostructure (one-side moth-eye).

Figure 8:
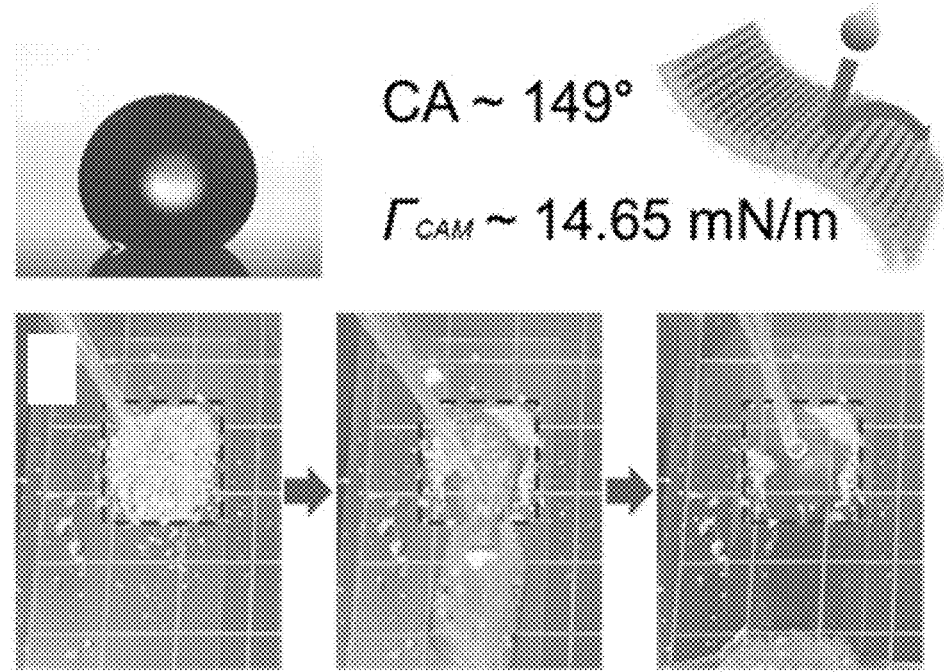
FIG. 8 shows an image (a) illustrating water droplets on the surface of a transparent ultra-thin film according to an embodiment of the present disclosure photographed with an optical microscope, and an image showing a contact angle of the water droplets, and an image (b) illustrating a self-cleaning effect of a transparent ultra-thin film according to an embodiment of the present disclosure.

In FIG. 8, (a) is an image showing water droplets on the surface of a transparent ultra-thin film according to an embodiment of the present disclosure photographed with an optical microscope, and an image showing a contact angle of the water droplets.

In FIG. 8, (b) is an image showing a self-cleaning effect of a transparent ultra-thin film according to an embodiment of the present disclosure.

In FIG. 8, (a) is an image showing water droplets on the surface of a transparent ultra-thin film according to an embodiment of the present disclosure photographed with an optical microscope, and an image showing a contact angle of the water droplets.

In addition, in FIG. 8, (b) visually shows the self-cleaning effect of the transparent ultra-thin film according to an embodiment of the present disclosure.

Figure 9:
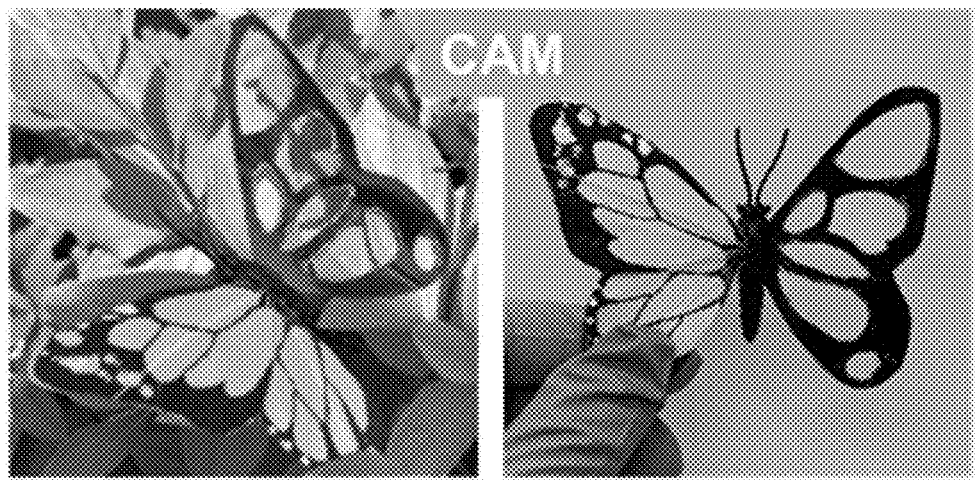
FIG. 9 is a digital image showing an artificial butterfly model to which a transparent ultra-thin film according to an embodiment of the present disclosure is applied.

FIG. 9 is a digital image showing an artificial butterfly model to which a transparent ultra-thin film according to an embodiment of the present disclosure is applied.

FIG. 9 shows an artificial butterfly model in which the transparent ultra-thin film according to an embodiment of the present disclosure is applied to the wings of the butterfly model.

Figure 10:
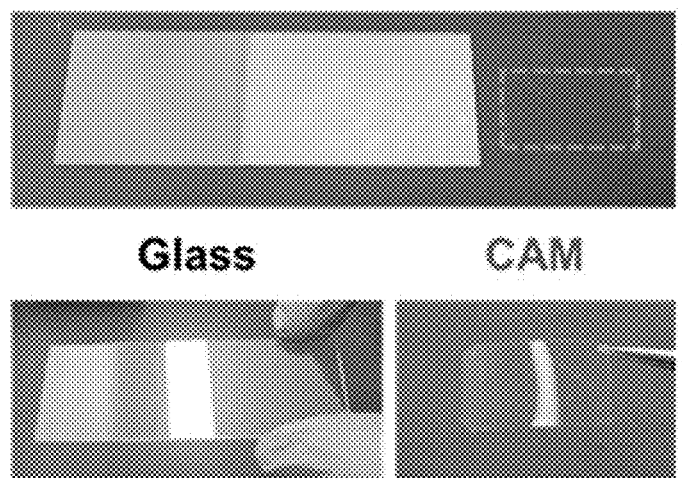
FIG. 10 is a digital image showing a difference in AR effect by comparing a transparent ultra-thin film according to an embodiment of the present disclosure and a glass.

FIG. 10 is a digital image showing a difference in AR effect by comparing a transparent ultra-thin film according to an embodiment of the present disclosure and a glass.

As shown in FIG. 10, when the glass and the transparent ultra-thin film 300 according to an embodiment of the present disclosure are placed on a flat surface with a gray background, the glass is visually confirmed, whereas the transparent ultra-thin film 300 according to an embodiment of the present disclosure is not visible to the naked eye, which proves that the transmittance of the present disclosure is high.

Figure 11:
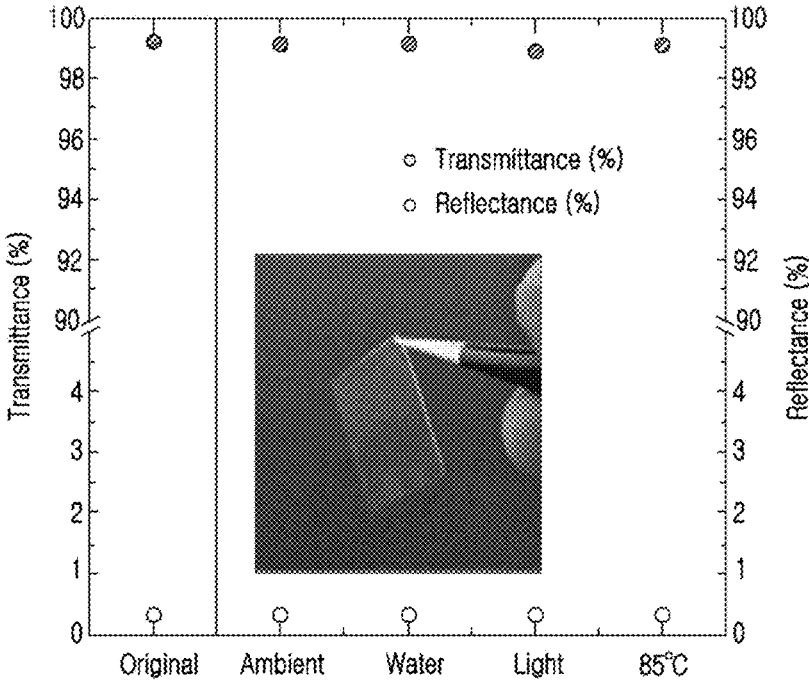
FIG. 11 is a graph showing long-term optical stability of a transparent ultra-thin film according to an embodiment of the present disclosure under various conditions for 168 hours.

FIG. 11 is a graph showing long-term optical stability of a transparent ultra-thin film according to an embodiment of the present disclosure under various conditions for 168 hours.

As shown in FIG. 11, as a result of observing the transparent ultra-thin film 300 according to an embodiment of the present disclosure for 168 hours under various conditions (ambient, water, light, 85° C.), it can be seen that there is no significant difference when the transmittance and reflectance are compared with the original value to which no separate condition is given. Through this, the optical long-term stability of the transparent ultra-thin film 300 according to an embodiment of the present disclosure can be confirmed.

Figure 12:
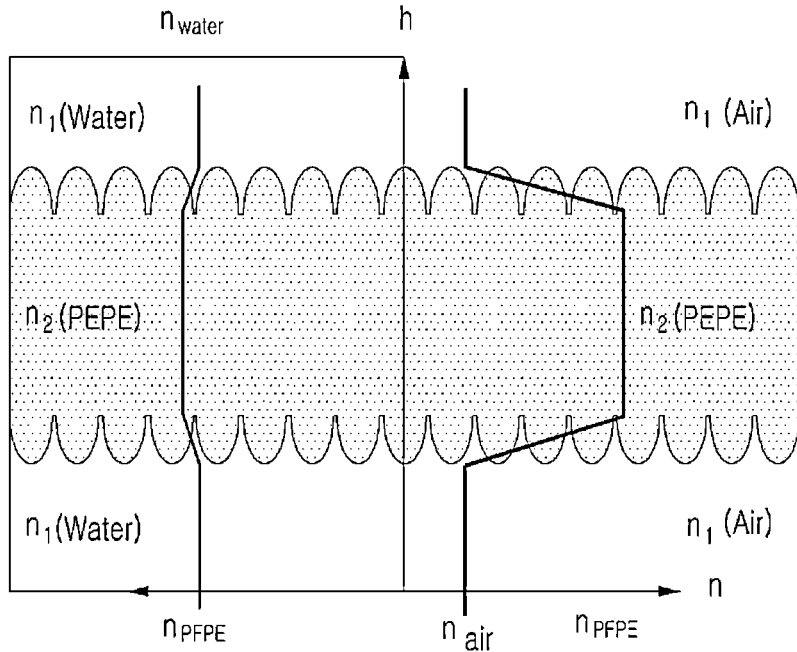
FIG. 12 is a graph comparing refractive index profiles of a transparent ultra-thin film according to an embodiment of the present disclosure in an air environment and an underwater environment.

FIG. 12 is a graph comparing refractive index profiles of a transparent ultra-thin film according to an embodiment of the present disclosure in an air environment and an underwater environment.

Referring to FIG. 12, it can be seen that the transparent ultra-thin film 300 according to an embodiment of the present disclosure has a smaller change in refractive index profile in an underwater environment (in water) than that in an atmospheric environment (in air).

Figure 13:
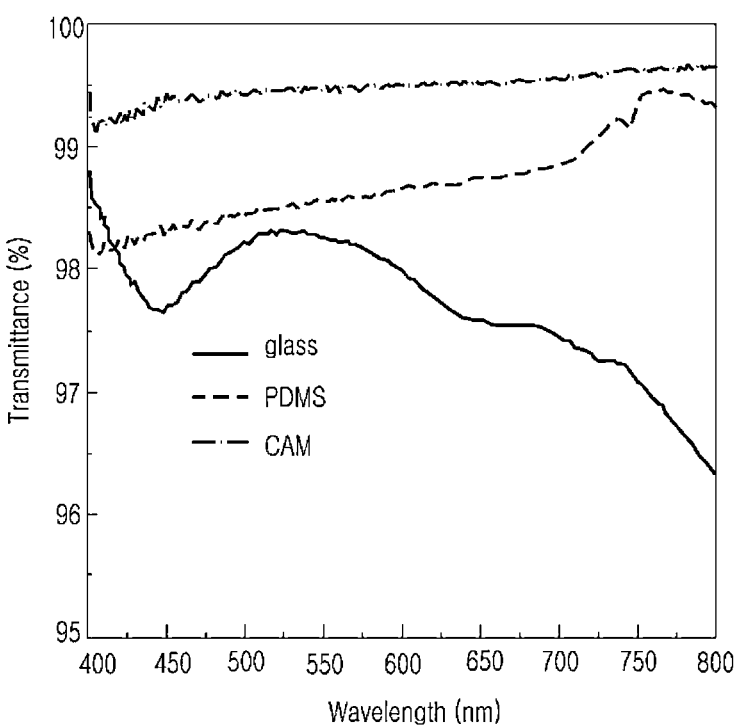
FIG. 13 is a graph showing transmittance in an underwater environment of a glass, a PDMS substrate, and a transparent ultrathin film according to an embodiment of the present disclosure.
Figure 14:
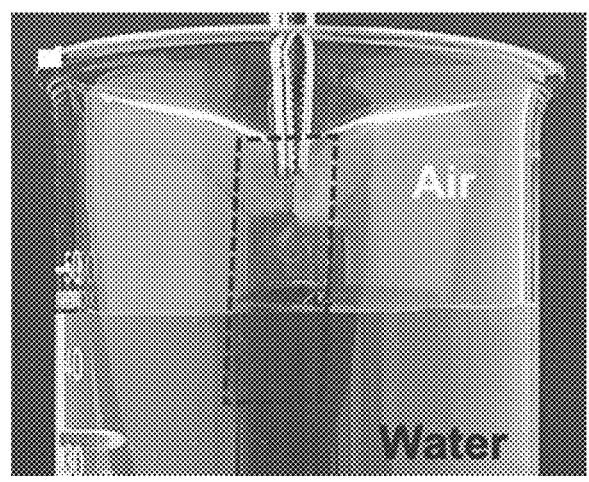
FIG. 14 is an image of a transparent ultra-thin film according to an embodiment of the present disclosure photographed in an air environment and an underwater environment.

FIG. 13 is a graph showing transmittance in an underwater environment of a glass, a PDMS substrate, and a transparent ultrathin film according to an embodiment of the present disclosure. FIG. 14 is an image of a transparent ultra-thin film according to an embodiment of the present disclosure photographed in an air environment and an underwater environment.

As shown in FIG. 13, it can be seen that in an underwater environment, the transmittance according to wavelength of the transparent ultra-thin film 300 according to an embodiment of the present disclosure is higher than that of a glass or PDMS substrate.

In this regard, referring to FIG. 14, it can be seen that the transparent ultra-thin film 300 according to one embodiment of the present disclosure can be visually confirmed in an atmospheric environment (air), but it is difficult to visually confirm the transparent ultra-thin film 300 an underwater environment (water).

Figure 15:
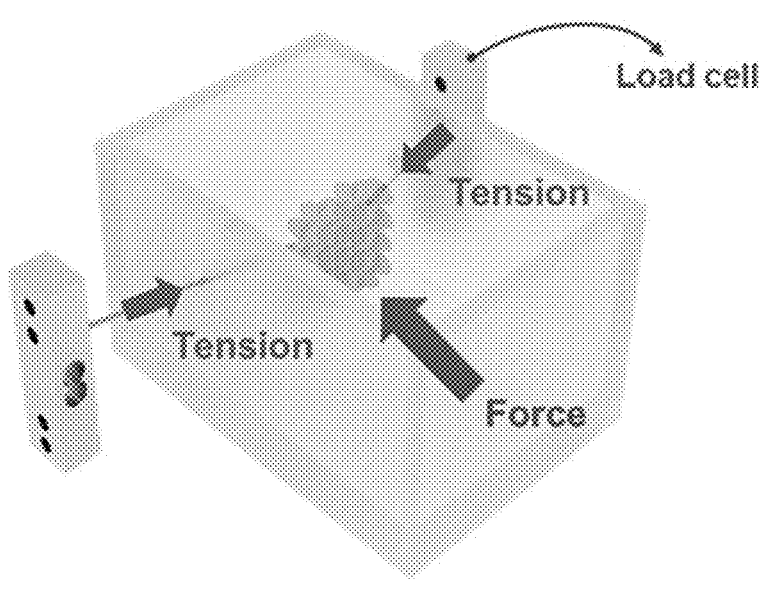
FIG. 15 is a conceptual diagram showing a transparent trap sensor demonstrated using a transparent ultra-thin film according to an embodiment of the present disclosure.
Figure 16:
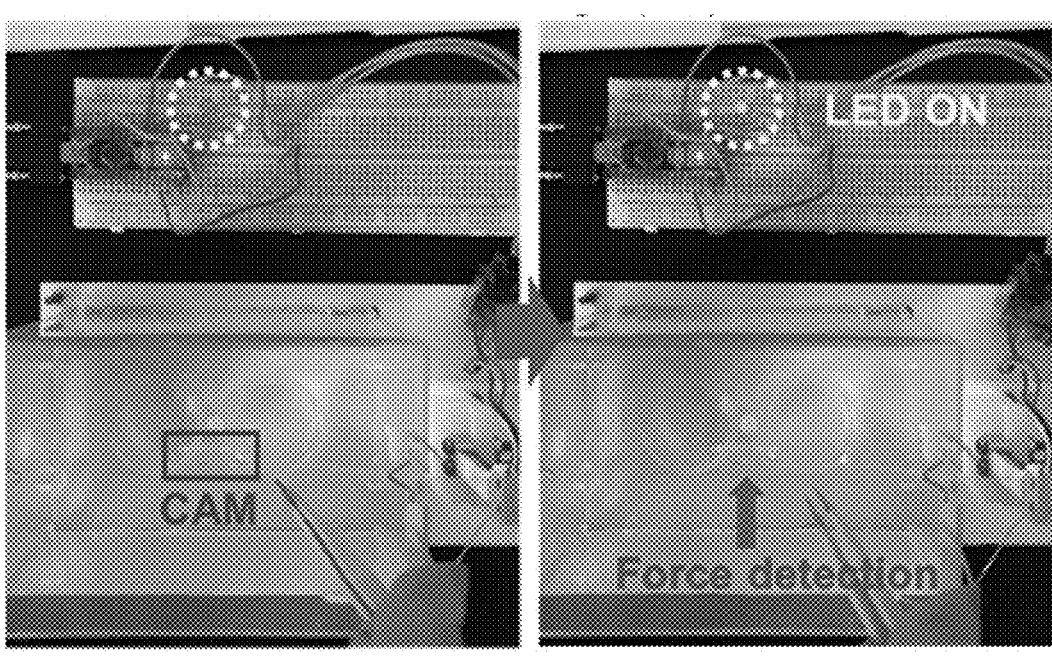
FIG. 16 is a diagram showing force sensing using a transparent ultra-thin film according to an embodiment of the present disclosure in an underwater environment with an LED lighting.
Figure 17:
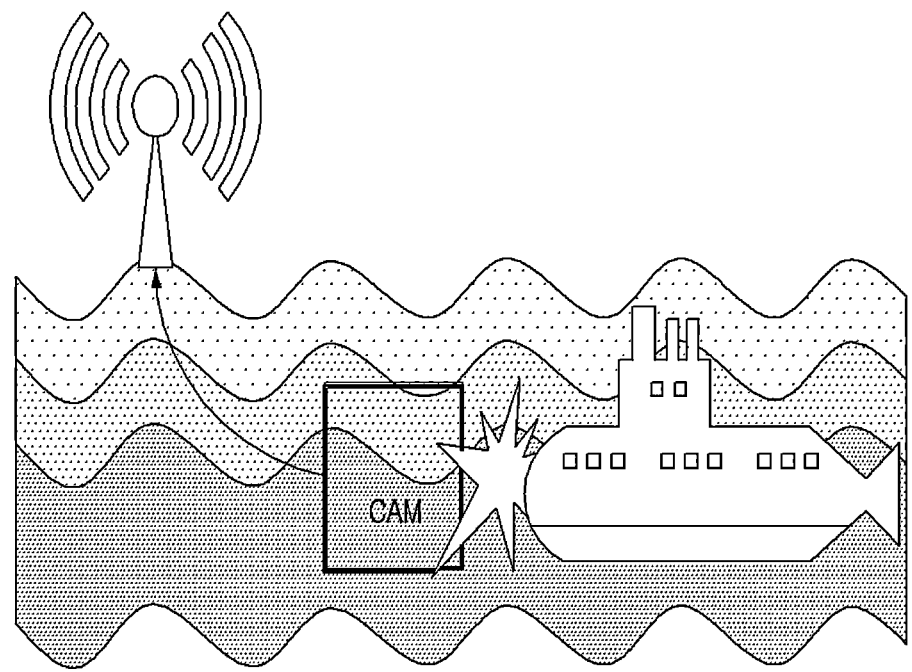
FIG. 17 is a conceptual diagram showing sensing of an underwater environment through an underwater sensor using a transparent ultra-thin film according to an embodiment of the present disclosure.

FIG. 15 is a conceptual diagram showing a transparent trap sensor demonstrated using a transparent ultra-thin film according to an embodiment of the present disclosure. FIG. 16 is a diagram showing force sensing using a transparent ultra-thin film according to an embodiment of the present disclosure in an underwater environment with an LED lighting. FIG. 17 is a conceptual diagram showing sensing of an underwater environment through an underwater sensor using a transparent ultra-thin film according to an embodiment of the present disclosure.

The transparent ultra-thin film according to an embodiment of the present disclosure can be applied as a transparent trap sensor as shown in FIGS. 15 to 17, and it can be applicable to ophthalmology and display industries such as smart glasses, multi-lens, and cameras.

The above described present disclosure is not only transparent in the atmospheric environment (in the air), but also becomes more transparent in the underwater environment (in the water).

The effect of the present disclosure according to the configuration as described above is to minimize the reflection of light irradiated to the plurality of elliptical structures by forming both sides of a plurality of elliptical structures integrally formed by combining side parts with each other in a semi-elliptical shape, so that the film is not only transparent in the atmospheric environment, but also becomes more transparent in the underwater environment. Therefore, the film can be applicable to ophthalmology and display industries such as smart glasses, multi-lens, and cameras.

The effects of the embodiments of the present disclosure are not limited to the above-mentioned effects, and it should be understood that the effects of the present disclosure include all effects that could be inferred from the configuration of the invention described in the detailed description of the invention or the appended claims.

The foregoing description of the present invention has been presented for illustrative purposes, and it is apparent to a person having ordinary skill in the field that the present invention can be easily modified into different forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

DESCRIPTION OF REFERENCE NUMERALS

100: silicon master
110: silicon base
120: silicon convex member
200: PUA mold
210: soft-PUA mold
211: soft-PUA mold base
212: soft-PUA mold concave member
220: hard-PUA mold
221: hard-PUA mold base
222: hard-PUA mold concave member
300: transparent ultra-thin film
310: elliptical structure
311: elliptical base
312: upper convex member
313: lower convex member

What is claimed is:

1. A method for manufacturing a transparent ultra-thin film comprising the steps of:
   (a) supplying a soft PUA precursor to a first silicon master having a silicon base and a plurality of silicon convex members on a surface of the silicon base, and curing the soft PUA precursor by irradiation with an ultraviolet ray, and supplying a hard-PUA precursor having a lower elastic modulus than that of the soft-PUA precursor to a second silicon master having a silicon base and a plurality of silicon convex members on a surface of the silicon base, and curing the hard-PUA precursor by irradiation with the ultraviolet ray;

(b) separating a soft-PUA mold having a concave member formed on a surface of the soft-PUA mold by curing the soft-PUA precursor from the first silicon master, and separating a hard-PUA mold having a concave member formed on a surface of the hard-PUA mold by curing the hard-PUA precursor from the second silicon master;

(c) supplying a perfluoropolyether precursor between the concave member of the soft-PUA mold and the concave member of the hard-PUA mold, and then curing the perfluoropolyether precursor by irradiation with the ultraviolet ray; and (d) separating an ultra-thin film having upper and lower convex members formed by curing the perfluoropolyether precursor from the soft-PUA mold and the hard-PUA mold, wherein the step (d) includes the steps of:

(d1) separating the soft-PUA mold from the ultra-thin film:

(d2) supplying a solvent to an edge of the ultra-thin film, and (d3) separating the hard-PUA mold from the ultra thin film.

2. The method of claim 1, wherein in the step (a), the silicon base of each of the first silicon master and the second silicon master is formed in a flat plate shape having a predetermined thickness, and the plurality of silicon convex members of each of the first silicon master and the second silicon master are coupled to an upper surface of the silicon base to form a matrix.

\* \* \* \* \*